United States Patent
Blaisdell et al.

(10) Patent No.: US 6,357,019 B1
(45) Date of Patent: Mar. 12, 2002

(54) METHOD AND APPARATUS FOR EMPLOYING NETWORK LOADABLE DEBUGGING AGENTS, CAPABLE OF FIRST FAILURE SUPPORT ON RETAIL VERSIONS OF SOFTWARE PRODUCTS

(75) Inventors: Russell C. Blaisdell, Austin; Edwin James Hilpert, Jr., Round Rock, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,014

(22) Filed: Jan. 29, 1999

(51) Int. Cl.[7] .................................................. G06F 11/00
(52) U.S. Cl. ............................................ 714/38; 714/25
(58) Field of Search ............................... 714/25, 37, 38; 717/1, 4, 11; 709/315; 713/100; 712/227

(56) References Cited

U.S. PATENT DOCUMENTS

| | | | | |
|---|---|---|---|---|
| 5,265,254 A | * | 11/1993 | Blasciak et al. | |
| 5,446,900 A | * | 8/1995 | Kimelman | |
| 6,012,152 A | * | 1/2000 | Douik et al. | |
| 6,026,237 A | * | 2/2000 | Berry et al. | |
| 6,205,560 B1 | * | 3/2001 | Hervin et al. | |

* cited by examiner

Primary Examiner—Gopal C. Ray
(74) Attorney, Agent, or Firm—David A. Mims, Jr.

(57) ABSTRACT

The present invention involves a system that employs network loadable debugging agents which are capable of first failure support for software products. The present invention enables the user working with object-oriented programming systems, such as AWT ("Abstract Windowing Toolkit") problems on the JavaOS operating system, to get an inside view of the system's graphics/messaging, etc., without having to run special builds of the system. It also allows the user to look into a problem on any network connected computer system running an object-oriented operating system, when the failure first occurs, without having to reload the system, reboot and recreate the problem.

28 Claims, 4 Drawing Sheets

METHOD AND APPARATUS FOR EMPLOYING NETWORK LOADABLE DEBUGGING AGENTS, CAPABLE OF FIRST FAILURE SUPPORT ON RETAIL VERSIONS OF SOFTWARE PRODUCTS

TECHNICAL FIELD

The present invention involves a system that employs network loadable debugging agents, which are capable of first failure support for software products. The present invention enables the user working with object-oriented operating systems to debug problems within various subsystems with specifically targeted debugging agents. The current implementation enables someone to look into, and interact with, the windowing subsystem on the JavaOS Network Computer operating System from any location on a network without the need for any special software to be loaded onto the system prior to a failure occurring. This same mechanism is capable of working on any object-oriented operating system connected to a network.

BACKGROUND OF RELATED ART

The 1990's decade has been marked by a societal technological revolution driven by the convergence of the data processing industry with the consumer electronics industry. Like all such revolutions, it unleashed a gigantic ripple effect of technological waves. The effect has, in turn, driven technologies which have been known and available but relatively quiescent over the years. Two of these technologies are the Internet and the Java Programming Language, which provide for network distribution of "object-oriented" programs to millions of users worldwide.

The computer and communications industries have extensively participated in the development and continual upgrading of the Java system. For details and background with respect to the Java system reference may be made to a typical text, "Just Java", 2nd Edition, Peter van der Linden, Sun Microsystems, 1997.

With the multitude of different computer architectures employed by the millions of users connected to the Internet, an obvious need became apparent: software programs that could be written once for all platforms, delivered across the Internet and would execute on the user's particular system consistent with the developer's design. This need was filled by Sun Microsystems' Java programming language and virtual machine architecture. Now developers could produce a single program that could be delivered to any computer and would execute correctly, regardless of the underlying computer's operating system. In doing so, Sun chose an object-oriented approach for their new language.

The combination of the Java language and virtual machine specification allow for objects to be sent across a network to a user machine where they will then execute some task on that machine.

In this context, the present invention specifically addresses the need for the user to gather information about a problem on an object-oriented computer operating system connected to a network without having to force the system to be rebooted and a different version of the operating system installed prior to diagnosing the problem. As a result of the present invention, when a problem occurs on the system, the user can download a debugging agent onto the system at that instant and subsequently collect information (or debug) the system the first time the problem occurs.

All debugging tools force the user of the failing system to intervene at the time of failure or they must use a special version of the operating system that is built for debugging, requiring them to restart their system and attempt to recreate the problem. It is, therefore, a distinct advantage to have a system that overcomes these problems. The present invention provides such a system and apparatus.

Before going into the details of the operation of the present invention, it would be appropriate to define certain terms which are used in the description of the current invention; these are listed below.

Definitions

"Java", well established in the late 1990's, is an object-oriented programming language, developed, as noted above, by Sun Microsystems, Inc. (Sun). While Java is similar to C++, Java is smaller, more portable and easier to use than C++. This is because it is more robust and it manages memory on its own.

Java was designed to be secure and platform neutral. In other words, it can be run on any platform that supports a Java Runtime Environment (JRE) and a Java Virtual Machine (JVM), since Java programs are complied into byte-codes, which are similar to machine code and are not specific to any platform. "AWT" (Java's Abstract Windowing Toolkit) is an integral part of the JRE that implements Java's Graphical User Interface (GUI). The Java AWT is a collection of classes that allow for the creation of platform independent user interfaces. Just as Java programs are platform independent, capable of running on any computer that has a JRE installed, so too are the user interfaces created with the AWT.

The term "debug" in this invention's context means to detect logical or syntactical errors in a program.

Another term used in connection with this invention is the term "Agent", which means a program entity that performs a task remote on the behalf of the caller.

The term "Internet" was derived from an early project by U.S. Defense Department and several universities called "ARPAnet" that interconnected several networks for easier collaboration and data sharing among the participating sites. The Internet grew out of this project, remaining in relative obscurity until the early 1990's when commercial ventures began populating it with interesting content.

The term "footprint" is defined as the amount of memory consumed by a computer program as it is initiated and executed in a computer system.

The term "Server" in the context of this invention, pertains to a computer that is capable of supplying objects or data via specific communication protocols to other systems on a network.

The term "snapshot" is defined as a collection of data describing the state of the machine being debugged, which is generally information in the memory of that computer.

The term "framework" as used in the context of this invention is a set of predefined classes which can be extended and combined to create a complete program.

SUMMARY OF THE PRESENT INVENTION

A need exists for the ability to collect information about a failing object-oriented computer system connected to a network the first time that a failure appears on that system. This includes collecting information on computer systems that do not contain any resident debugging facilities, as well as being able to collect this information without any intervention by the user.

This invention enables a networked computer's problems to be investigated by specialized agents that are loaded onto the failing system over a network after the failure appears. These agents are then capable of interacting with the failing system to enable a remote user to obtain enough information to diagnose the problem.

Thus, the following advantages are attained via the use of the system representing the present invention:

1. The ability to collect information on problems when they first occur on a networked computer.
2. The ability to have a large set of highly specialized "agents" that are each capable of dealing with separate parts of the product, that can be selected and downloaded based on the symptoms of the problem.
3. Where normal debuggers must be built into the system causing a growth in the product's footprint, this method enables a product to maintain it's normal size and performance while still being able to be debugged when necessary.
4. There is no need to provide multiple versions of a product (normally termed "retail and debug images").
5. The problem of intermittent failures only appearing on retail images is eliminated.
6. There is no longer a need to reload a system with a "debug" image prior to recreating the problem in order to diagnose it, since agents are loaded onto the system at the first sign of a failure.

BRIEF DESCRIPTION OF THE DRAWINGS

The present invention will be better understood and it's numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
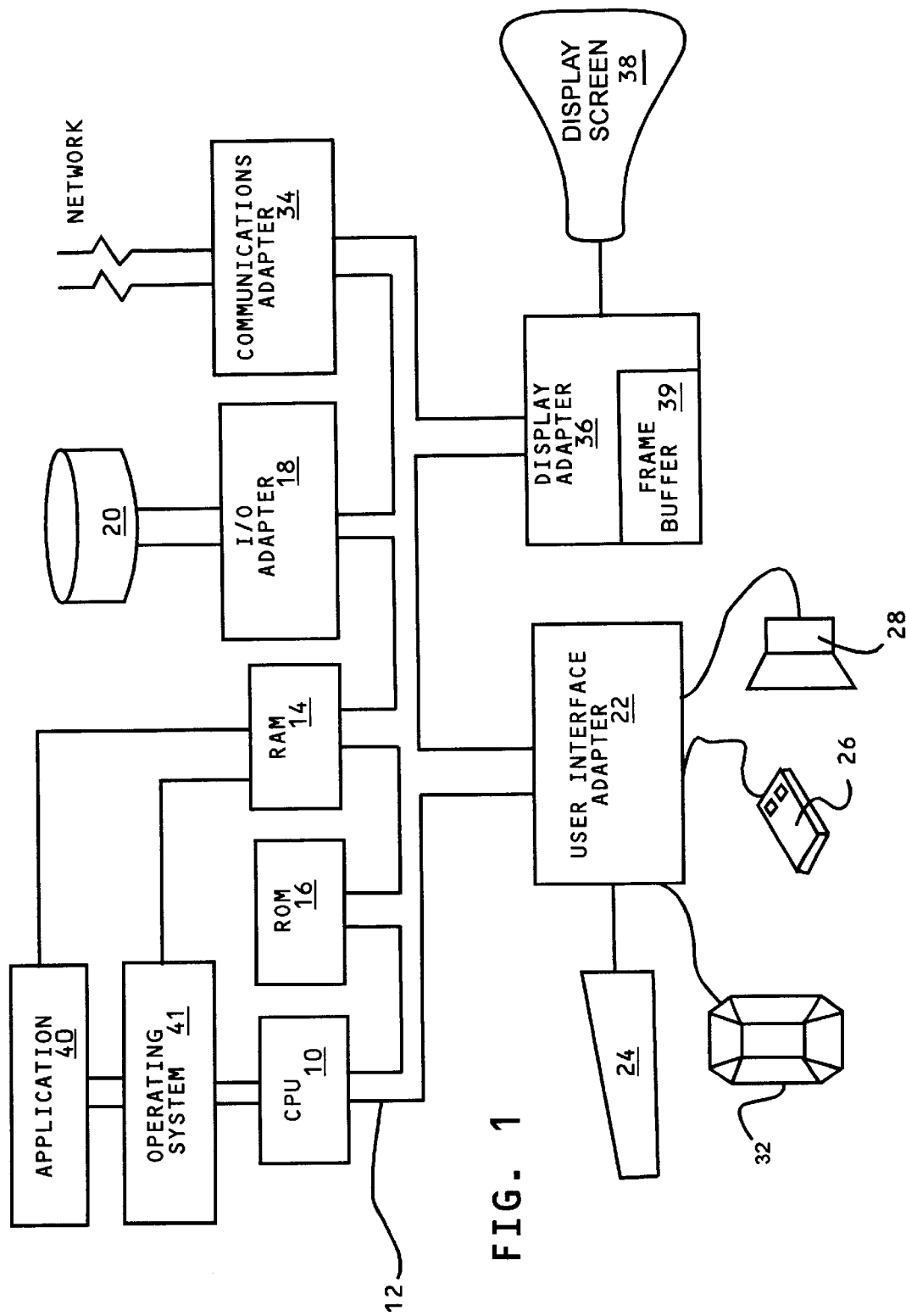
FIG. 1 is, for purposes of background, a block diagram of a data processing system including a central processing unit and network connections via a communications adapter which is capable of implementing the present invention.

The following represents background information on the Environment required for this invention.

Before going into the details of specific embodiments of the present invention, it will be helpful to understand from a more general perspective the various elements and methods which may be used to implement the present invention. The present invention is implemented using the Java programming language executing within a JRE. The Java system and language are extensively familiar to those skilled in the art. The text, "Just Java", described above comprehensively details the system and language. Nonetheless, it should be helpful to generally review the known principles of object-oriented programming.

It should be understood by those skilled in the art that object-oriented programming techniques involve the definition, creation and use of "objects". These objects are software entities comprising data elements or attributes and methods, which manipulate the data elements. The data and related methods are treated by the software as an entity and can be created, used and deleted as such. The data and functions enable objects to model their real world equivalent entity in terms of its attributes, which can be presented by the data elements, and its behavior, which can be represented by its methods.

Objects are defined by creating "classes", which are not objects themselves but which act as templates that instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object-oriented programming techniques: encapsulation, polymorphism and inheritance. Objects can be designed to hide or encapsulate all or a portion of the internal data structure and the internal functions. More particularly, during program design, a program developer can define objects in which all or some of the data variables and all or some of the related methods are considered "private", or for use only by the object itself. Other data or methods can be declared "public", or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and prevents the program from being run.

Polymorphism allows objects and functions which have the same overall format, but which work with different data, to function differently to produce consistent results. For example, an addition method may be defined as variable A+variable B, (A+B). The same format can be used whether the A and B are numbers, characters or dollars and cents. However, the actual program code which performs the addition may differ widely depending on the type of variables which comprise A and B, (i.e. numbers, characters and dollars). After the methods have been defined, a program can later refer to the addition method by its common format (A+B) and, during compilation, the compiler will determine which of the three methods to be used by examining the variable types. The compiler will then substitute the proper function code.

A third property of object-oriented programming is inheritance, which allows program developers to reuse preexisting objects and their methods. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass, borrowing the functionality of another class, allows software developers to easily customize existing code to meet their particular needs. It also allows the creation of new but similar objects by defining what is different from the ancestor object.

Although object-oriented programming offers significant improvements over other programming concepts, program development still requires significant outlays of time and effort, especially if no preexisting software programs are available for modification. Consequently, a set of predefined interconnected classes are sometimes provided to create a set of objects and additional miscellaneous routines, which are all directed to perform commonly encountered tasks in a particular environment. Such predefined classes are typically called "frameworks" and essentially provide a prefabricated structure as a basis for creating a working application program.

In object-oriented programming such as the previously described Java system, there are frameworks provided for the developer which contain a set of predefined interface objects. These frameworks contain predefined classes which can be used as base classes. A developer may accept and incorporate some of these classes into his own classes, or he may modify or override classes provided in these frameworks to extend the framework and create customized solutions in particular areas of expertise.

Referring to FIG. 1, a typical data processing system is shown which may be used in conjunction with object-oriented software, such as Java, in implementing the present invention. A central processing unit (CPU), such as one of the PowerPC™ microprocessors available from International Business Machines Corporation (IBM) (PowerPC is a trademark of International Business Machines Corporation) is provided and interconnected to various other components by system bus 12. An operating system 41 runs on CPU 10, provides control and is used to coordinate the function of the various components of FIG. 1. Operating system 41 may be one of the commercially available operating systems such as DOS, or the OS/2™ operating system available from IBM (OS/2 is a trademark of IBM) or the JavaOS network computer operating system from Sun and IBM. An object-oriented programming system such as Java 40 runs in conjunction with operating system 41 and provides output calls to the operating system 41 which implements the various functions to be performed by the application 40. The Java programming system, in combination with the operating system, provides the basic platform with which software developers will develop and end users will use the object-oriented software of this invention.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components, including the operating system 41 and the Java application 40, are loaded into RAM 14, which is the computer system's main memory. I/O adapter 18 may be a small computer system interface (SCSI) adapter that communicates with the disk storage device 20, i.e. a hard drive.

Since the present invention can be implemented in the Java object-oriented programming system, some initial comments concerning object-oriented programming principles as embodied in Java should be appropriate. Since object-oriented programming systems have been rapidly developing in recent years, including systems and languages other than Java, there is still an absence of universality in the terminology which is being used in the art to describe various object-oriented programming functions. It will be understood by those skilled in the art that other terms may have been used to describe the principles which we will discuss herein. As set forth in the above-mentioned references, Java is a fully object-oriented programming system which operates in any environment that provides an implementation of the JRE. Java includes a wealth of frameworks, class libraries and a new programming environment intended to greatly enhance application software development, especially for programs distributed over the Internet. It is intended to be fully portable between operating systems. There is a defined commonality between users factored into a set of services and frameworks. In Java, as in all highly sophisticated object-oriented systems, writing an application program means creating a set of linked objects integrated into the Java operating system platform. Software developers rely on this platform for both a sophisticated set of services and a framework to develop software. The frameworks provide powerful abstractions which permit software developers to concentrate on their problem rather than building up infrastructures. Furthermore, the abstractions for the software developers are very close to the fundamental concepts that users must understand to operate the software. All this makes the development of applications easier.

Referring to FIG. 1, a typical data processing system is shown which may function as the local computer used in implementing the system of the present invention by acting as the system with the agent control program. A central processing unit (CPU) 10, such as one of the PC microprocessors available from IBM, is provided and interconnected to various other components by system bus 12. An operating system 41 runs on CPU 10, provides control and is used to coordinate the function of the various components of FIG. 1. Operating system 41 may be one of the commercially available operating systems such as the OS/2; Microsoft's Windows 95™ or Windows NT™, as well as UNIX or AIX operating systems or any number of embedded or special purpose operating systems which provide a JRE. Application 40, to be subsequently described in detail, runs in conjunction with operating system 41 and provides output calls to the operating system 41 which implement the various functions to be performed by the application 40.

In the implementation of the invention, application 40 will be communicating with other nodes within a network. The computer of FIG. 1 communicates with the network through the communications adapter 34. Since many of the aspects of the present invention involve access via networks, some background with respect to networks would be appropriate at this point. We will not go into great detail in describing the networks to which the present invention is applicable. U.S. Pat. No. 5,295,244, Dev et al., and U.S. Pat. No. 5,353,399, Kuwamoto et al., adequately detail conventional networks to which the present invention would be applicable, including appropriate network management and display terminal access to such networks. Reference has also been made to the applicability of the present invention to a global network such as the Internet. For details on Internet nodes, objects and links, reference is made to the text, "Mastering the Internet", G. H. Cady et al., published by Sybex Inc., Alameda, Calif. 1996.

Any data communication system which interconnects or links computer controlled systems or network elements at various sites or network nodes defines a communications network. A network may be as simple as two linked computers or it may be any combination of LANs (Local Area Networks, such as a building ethernet or token ring), or WANs (Wide Area Networks, connecting computers over long distances, such as X.25 or FDDI). Of course, the Internet is a global network of a heterogeneous mix of computer technologies and operating systems. At each level in a network hierarchy, the unit may be considered as a local network unit at which the present invention may be implemented. For example, since the Internet connects networks of computers, a particular corporate network could be such a localized Internet element. Also, the particular LAN of each department in the corporate network could be a localized unit. At high levels, regional networks representative of cities could be considered to be the localized units to which this invention is applicable.

DETAILS OF THE CURRENT INVENTION

Figure 2:
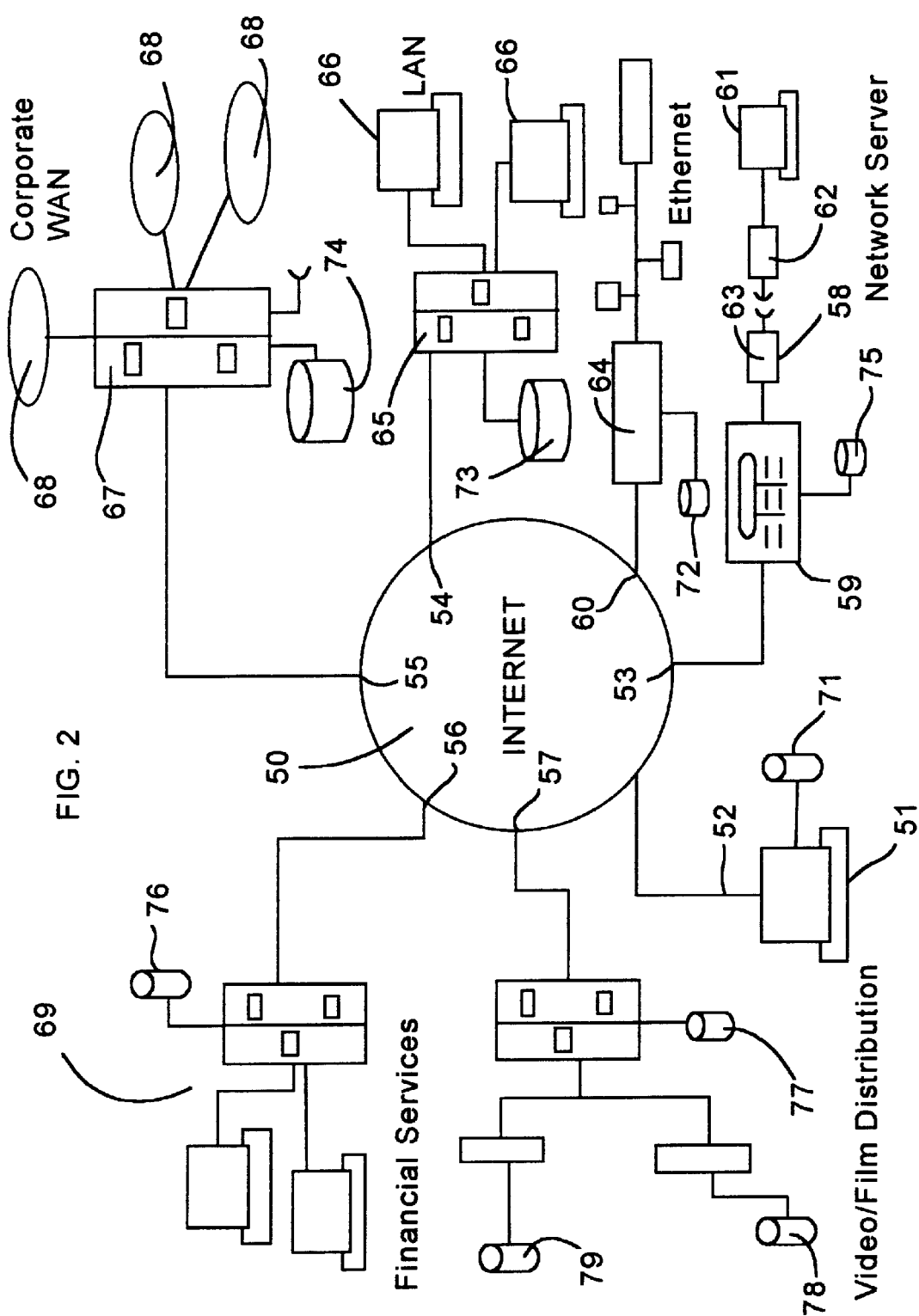
FIG. 2 is, for purposes of background, a generalized diagrammatic view of a network showing the local nodes in which the present invention may be implemented.
Figure 3:
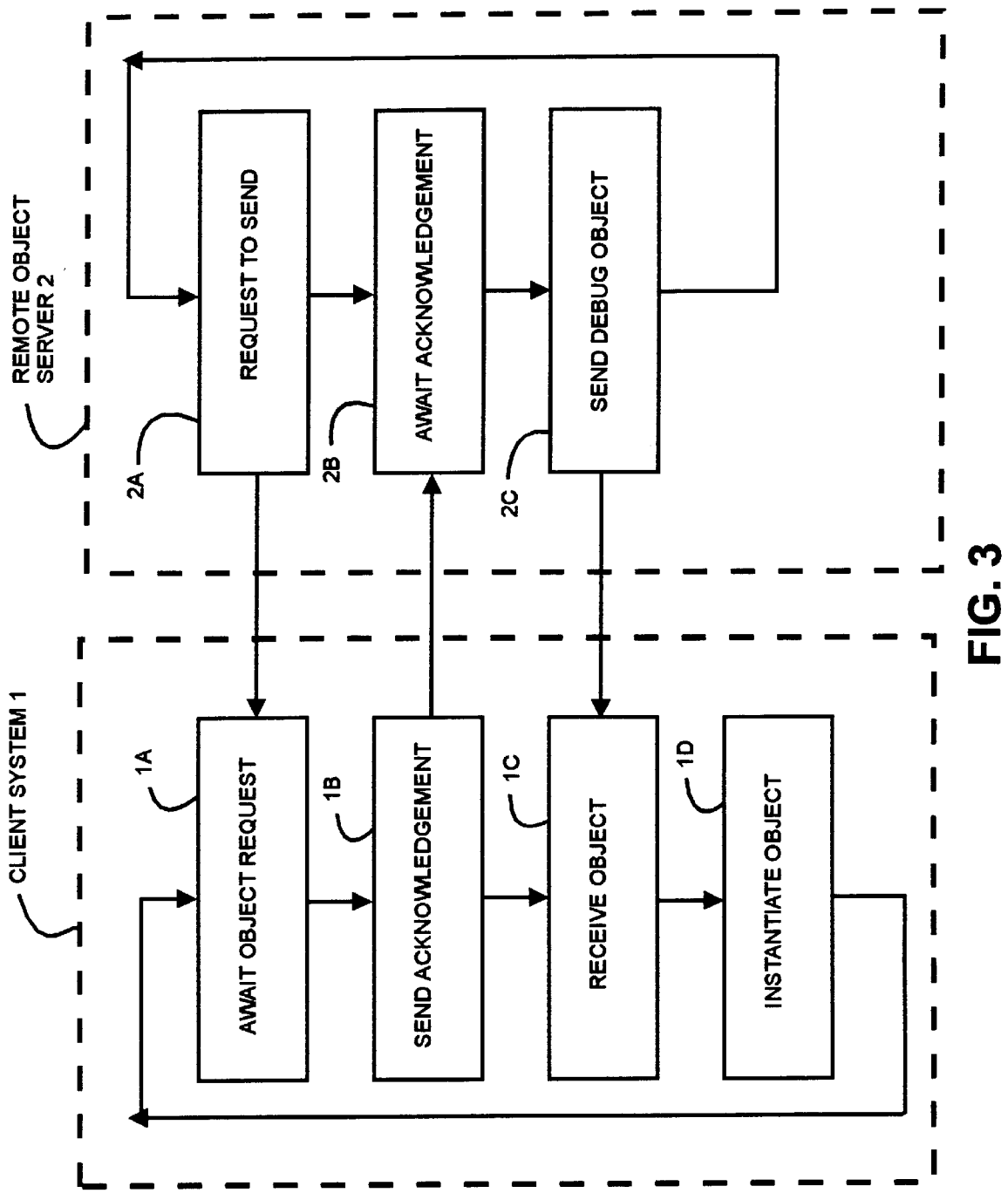
FIG. 3 is a flowchart specifically demonstrating the step-by-step operation of the present invention showing the interactions of the client system and the remote server.

As an example of a network in which this invention could be applied, reference is made to FIG. 2 which is a generalized diagram of a portion of the Internet.

In this example, computer system 51 will be considered the computer system running the agent control program. Computer system 61 will be the system encountering the failure that we wish to diagnose and computer system 65 will be the remote object server.

Regarding the present System, it consists of special Java based agents that are available on a server (FIG. 2, number 65), which can be loaded onto the client (FIG. 2, number 61) at the time of failure, to provide specific information based on the problem characteristics. The implementation of this system windowing debug agent involves the following steps.

At the time of failure, the user of the agent control program would initiate a load of the selected agent from the remote object server (FIGS. 3, 2a–2c) onto the failing system (FIGS. 3, 1a–1d). Once the agent object has been loaded, it will await a network connect from its agent control program (FIGS. 4, 3a).

Figure 4:
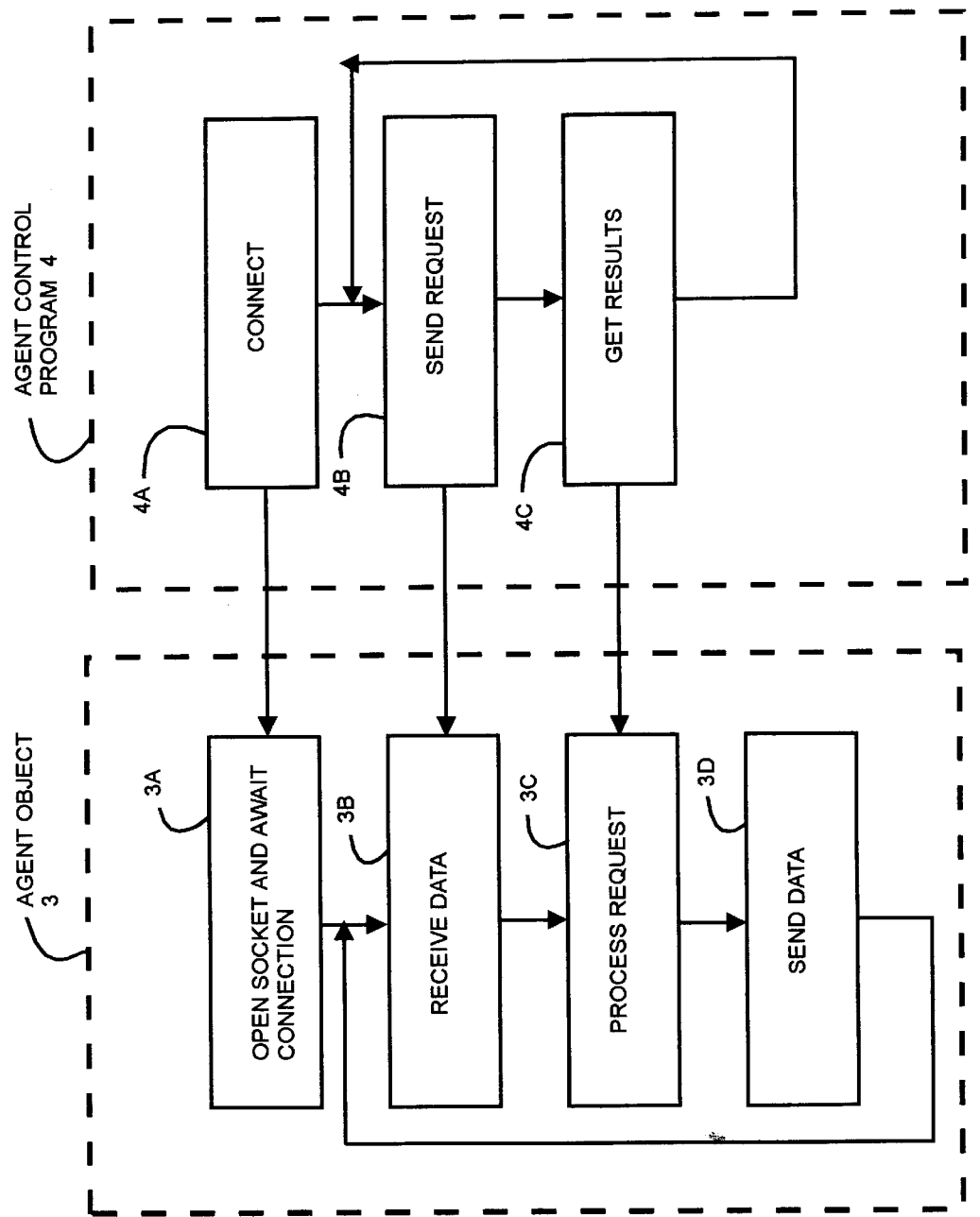
FIG. 4 is a continuation of FIG. 3 showing the interactions between the agent object and the agent control program.

After connecting (FIGS. 4, 3a & 4a) the agent object will begin to process requests from the agent control program (FIGS. 4, 4b & 3b–3c) and provide the requested data (FIGS. 4, 3d).

The agent control program running on system 51 (again referencing FIG. 2) can thereby control the agent object on system 61 to diagnose the specific problem and determine the appropriate fix. This works across the network so there is no requirement to be geographically near the system being debugged. Since these agent objects are only resident in the memory of the normal system when they are loaded by the user, there is no impact on the system footprint or performance and it works equally well on debug and nondebug systems.

For development purposes, the present invention enables the rapid creation of very good diagnostic tools that have no impact on the product's built-in code base. These tools can be built by developers who have no experience in developing system debuggers.

Whereas a normal debugger must be small and light, the "agents" of the current invention can be larger and more complex and, thus, more effective and efficient, since they are only placed on the system once a problem is detected in a specific area. This enables the developer to create very competent agents that can be specifically tailored to the system, but only brought down onto a system when an actual need arises.

Since the agents can be built to provide a very detailed picture of the problem occurring and can also be made to "snapshot" the failure and return a complete report, the program developer can use the derived data to help resolve the problem.

The current implementation consists of a Java based operating system service and a Java based client program. When needed, an agent object can be loaded onto the client where it will await a connection from a Java based agent control program. Once connected, the agent control program can remotely communicate with the agent object, thereby gathering data from the system as to the current state of all windows and their associated graphics objects, as well as dynamically monitoring all activity on the system that affects the windowing and graphics systems. This includes all mouse and keyboard activity.

Another embodiment of this invention provides a useful avenue for developers to build agent objects that can be used to obtain information on memory usage. This can be used for an area of the system where there is data that is desired to be collected from a client system without adding this into the normal product image. However, the user still wants the ability to get the data dynamically and asynchronously.

While the invention has been shown and described with reference to particular embodiments thereof, it will be understood by those skilled in the art that the foregoing and other changes in form and detail may be made therein without departing from the spirit and scope of the invention.

What is claimed is:

1. In a computer controlled object-oriented programming system having means for interfacing a plurality of programming objects with each other, to provide combination objects combining programming functions of said objects, each object respectively including predetermined interface data defining a required common interface with the other programming objects through which interface of said objects are further combined to form objects of increasing complexity which function as program versions; the improvement wherein said system further comprises, network loadable debugging agents, capable of failure support on a first failure detection on software products comprising:

detecting means for when said failures first occur;

specialized debugging "agents" means, each capable of interacting with separate parts of a software product, and which are selected based on the symptoms of the problem, means for downloading a debugging agent;

means of interacting said debugging agent with said detected failure.

2. The system of claim 1 wherein said debugging agent is used to work with problems on any software operating system where said operating system is an object-oriented operating system.

3. The system of claim 1 wherein said debugging agent is used to work with AWT problems on the JavaOS Operating System.

4. The system of claim 1 wherein a user, working with AWT problems on the JavaOS operating system, can view the systems graphics and messaging, without the need to run special builds of said system.

5. The system of claim 1 wherein said agents are capable of dealing with separate components of said software product and are capable of selection and downloading on said first failure detection on said network system.

6. The system of claim 1 wherein a user can wait until a problem occurs on a normal system and then subsequently download said debugging agent at that point or said user can download said debugging agent at any time and with any system.

7. The system of claim 1 wherein each of said agents are constructed to provide exactly the level of information required to resolve a problem for a specific component.

8. The system of claim 1 wherein there is eliminated the need to reload a new product image upon detection of said failure.

9. The system of claim 1 wherein an intermittent problem occurs and where said failure only occurs with a nondebug image of the system, said system allows a user to collect information the first time said failure occurs and does not require said user to use a special build of the system.

10. The system of claim 1 wherein a user can obtain information on memory usage for an area of the system where there is data that is desired to be collected from a client system, but said user does not wish to add this into the normal product image; while still providing the user with the ability to obtain said data "on-the-fly".

11. In a computer system implemented with object-oriented programming methods having the means to interface a plurality of programming objects with each other, to provide combination objects combining programming functions of said objects, each object respectively including predetermined interface data defining a required common interface with the other programming objects through which interface said objects are further combined to form objects of increasing complexity which function as program versions, the improvement wherein said method further comprising the steps of:

providing network loadable debugging agents, capable of failure support on a first failure detection on software products comprising:

detecting said failure's first occurs;

providing specialized debugging agents means, each capable of interacting with separate parts of a software product, and which are selected based on the symptoms of the problem, downloading a debugging agent; and interacting said debugging agent with said detected failure.

12. The method of claim 11 wherein said debugging agent is used to work with problems on any software operating system.

13. The method of claim 11 wherein said debugging agent is used to work with AWT problems on the JavaOS operating system and where said operating system is an object-oriented operating system containing a Java Runtime Environment.

14. The method of claim 11 wherein a user, working with AWT problems on the JavaOS Operating System, can view the systems graphics and messaging, without the need to run special builds of said system.

15. The method of claim 11 wherein said agents are capable of dealing with separate components of said software product, are capable of selection and downloading on said first failure detection on said computer system across said network.

16. The method of claim 11 wherein a user can wait until a problem occurs on a normal system and then subsequently download said debugging agent at that point or said user can download said debugging agent at any time and with any system.

17. The method of claim 11 wherein each of said agents are constructed to provide exactly the level of information required to resolve a problem for a specific component.

18. The method of claim 11 wherein there is eliminated the need to reload a new product image upon detection of said failure.

19. The method of claim 11 wherein an intermittent problem occurs and where said failure only occurs with a nondebug image of the system, said system allows a user to collect information the first time said failure occurs and does not require said user to use a special build of the system.

20. In a computer controlled object-oriented programming system having means for interfacing a plurality of programming objects with each other, to provide combination objects combining programming functions of said objects, each object respectively including predetermined interface data defining a required common interface with the other programming objects through which interface said objects are further combined to form objects of increasing complexity which function as program versions, the improvement wherein in said system further comprises, a computer readable program having data structures included on a computer readable medium employing network loadable debugging agents, capable of failure support on a first failure detection on software products comprising:

means for detecting said failure's first occurs;

specialized debugging agents means, each capable of interacting with separate parts of a software product, and which are selected based on the symptoms of the problem, means for downloading a debugging agent; and means of interacting said debugging agent with said detected failure.

21. The system of claim 20 wherein said debugging agent is used to work with problems on any software operating system.

22. The computer readable program of claim 20 wherein said debugging agent is used to work with AWT problems on a JavaOS operating system and where said operating system is an object-oriented operating system.

23. The computer readable program of claim 20 wherein a user, working with AWT problems on the JavaOS operating system, can view the systems graphics and messaging, without the need to run special builds of said system.

24. The system of claim 20 wherein said agents are capable of dealing with separate components of said software product, are capable of selection and downloading on said first failure detection on said computer system across said network.

25. The computer readable program of claim 20 wherein a user can wait until a problem occurs on a normal system and then subsequently download said debugging agent at that point or said user can download said debugging agent at any time and with any system.

26. The computer readable program of claim 20 wherein each of said agents are constructed to provide exactly the level of information required to resolve a problem for a specific component.

27. The computer readable program of claim 20 wherein there is eliminated the need to reload a new product image upon detection of said failure.

28. The computer readable program of claim 20 wherein an intermittent problem occurs and where said failure only occurs with a nondebug image of the system, said system allows a user to collect information the first time said failure occurs and does not require said user to use a special build of the system.

* * * * *